O. P. NORMAN.
MECHANICAL MOVEMENT.
APPLICATION FILED SEPT. 10, 1917.
1,268,048.
Patented May 28, 1918.
2 SHEETS—SHEET 1.
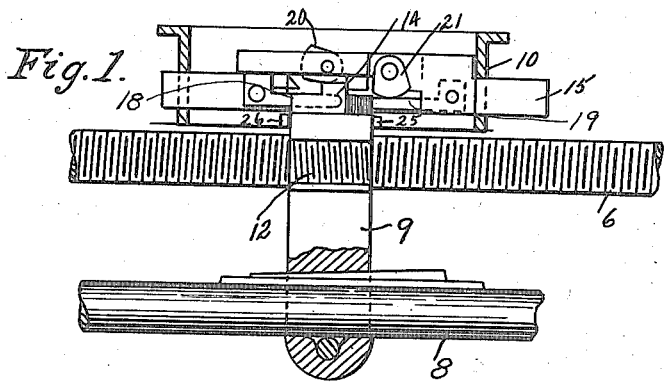
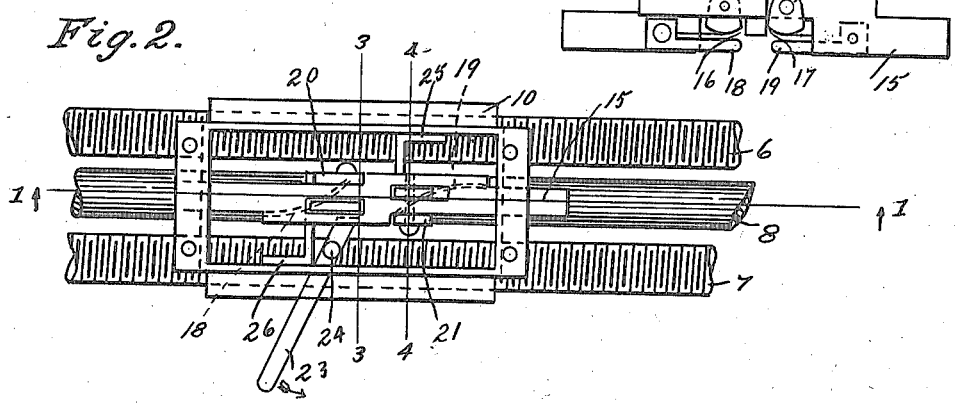
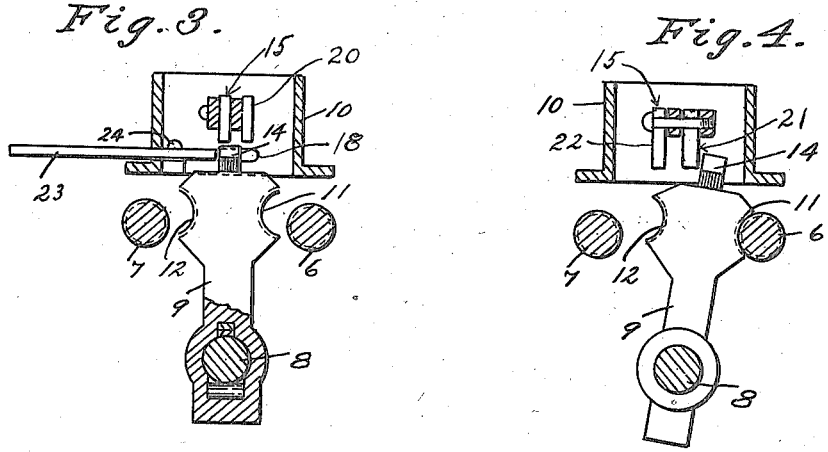
Inventor,
Orville P. Norman,
By Westall and Wallace
His Attorneys.

O. P. NORMAN.
MECHANICAL MOVEMENT.
APPLICATION FILED SEPT. 10, 1917.
1,268,048.
Patented May 28, 1918.
2 SHEETS—SHEET 2.
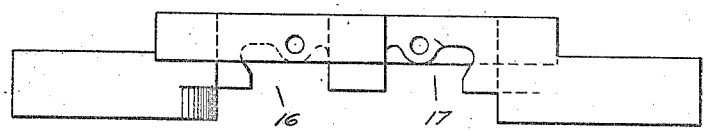
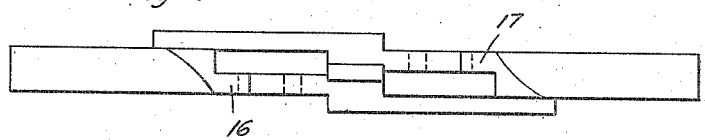
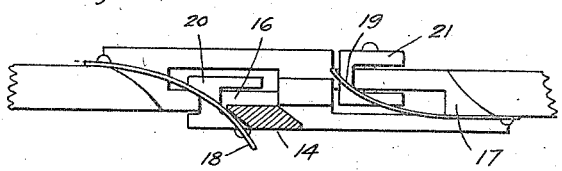
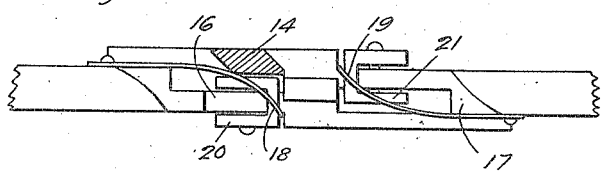
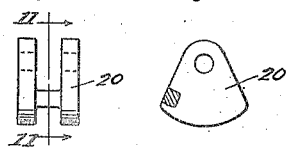
Inventor
Orville P. Norman
by Westall and Wallace
his Attorneys

UNITED STATES PATENT OFFICE.

ORVILLE P. NORMAN, OF LOS ANGELES, CALIFORNIA.

MECHANICAL MOVEMENT.

1,268,048.          Specification of Letters Patent.      Patented May 28, 1918.

Application filed September 10, 1917. Serial No. 190,450.

*To all whom it may concern:*

Be it known that I, ORVILLE P. NORMAN, a citizen of the United States, residing at Los Angeles, in the county of Los Angeles and State of California, have invented new and useful Improvements in Mechanical Movements, of which the following is a specification.

This invention relates to a mechanical movement for transforming rotary into reciprocating movement, and pertains especially to a movement of the type disclosed in my patent for mechanical movement, 1,210,353, December 26, 1916. This invention is an improvement in the device disclosed in said patent.

The movement shown herein comprises two conveyer screws, a conveyer which engages either one of the screws being transferred from one to the other to change the direction of movement, and a carriage which the conveyer moves; the carriage has mounted therein all the devices for changing the conveyer from one screw to the other.

It is an object of this invention to provide a mechanical movement having a change bar which locks the conveyer against either screw after its transfer from one screw to the other and which does not require tension springs.

It is a further object of this invention to provide the movement with a lever for locking the conveyer in neutral position, so that the carriage may be moved at will to any desired position.

I have illustrated an embodiment of my invention in the accompanying drawing, in which:

Figure 1, is a front elevation in section as seen on the line 1—1 of Fig. 2. Fig. 2, is a plan view, the lever being shown locking the conveyer in neutral position. Fig. 3, is a section as seen on the line 3—3 of Fig. 2. Fig. 4, is a section similar to Fig. 3, but with the conveyer locked against one of the screws. Fig. 5 is an elevation of the change bar. Fig. 6 is an enlarged elevation of the change bar with the spring fingers and latches removed. Fig. 7 is a bottom plan view of the change bar as shown in Fig. 6. Fig. 8 is a fragmentary bottom plan view of the complete change bar with the head shown in section and in position about to be transferred to the other side of the bar. Fig. 9 is a view similar to Fig. 8 showing the head and latch after transfer. Fig. 10 is an enlarged end view of a latch. Fig. 11 is a section through the latch on the line 11—11 of Fig. 10.

Broadly the mechanical movement comprises two parallel conveyer screws 6 and 7, which are rotated in opposite directions by means of suitable gearing, not shown in the drawing. Disposed below the screws is a guide shaft 8. Mounted upon the guide shaft 8 for sliding and pivotal movement thereon is a conveyer 9. Engaged with the conveyer 9 is a carriage 10, which is guided by suitable means, not shown, so that it may be moved to the right or to the left.

The conveyer 9 has threads formed upon its opposite sides, which in effect form segmental nuts 11 and 12. The threads on the conveyer are so arranged that, when the conveyer rests against one screw, the threads on the nut will mesh with the threads on the screw. When rocked in the opposite direction, the threads on the opposite side of the conveyer arm will mesh with the threads on the opposite screw. In this manner upon rotation of the screws the conveyer is carried in opposite directions, depending upon which screw it is engaged with. The conveyer is formed with a head 14, which is operated upon by spring fingers to transfer the conveyer from one screw to the other.

The carriage frame is of box like form open at the top and at the bottom. Extending longitudinally of the carriage and slidably supported in openings therein for longitudinal movement thereof with respect to the frame is a change bar 15. The change bar is formed with adjacent notches 16 and 17 on its lower portion separated by a lug at the center thereof. The head of the conveyer is arranged to pass through these notches from one side of the change bar to the other. Spring fingers 18 and 19 are affixed to the change bar at opposite sides thereof, with the free ends overlying the notches 16 and 17 respectively. The free ends of the spring fingers extend through the notches and are bent in such a way that, as the change bar is moved with respect to the carriage the end of a finger will engage the head 14 of the conveyer and force the same through a notch in the change bar to the opposite side of the latter and against the other screw.

In order to lock the conveyer in position, after it has passed through the change bar, I have provided latches 20 and 21 which are pivotally mounted on the change bar, latch 20 over notch 16 and latch 21 over notch 17. These latches are weighted and normally position themselves to close the notches 16 and 17 against passage of the head 14 of the conveyer. Each latch is bifurcated so that it may be easily attached to the change bar as will be noted from an inspection of Figs. 10 and 11. Referring to Figs. 4 and 8, the head 14 of the conveyer arm, when the conveyer is engaged with screw 6, will be disposed in line with one arm of the latch 20. As the change bar is moved toward the conveyer head, the arm comes in contact with head 14; and as the latch is pivoted, the latter is lifted, as shown in Figs. 1 and 8, so that the notch 16 through the change bar is clear. The spring 18 will engage the head 14 and force the conveyer through the notch 16 and into engagement with screw 7. As soon as the conveyer passes through the notch 16 into the position shown in Fig. 9, the latch 20 drops and closes the notch behind the conveyer thereby locking the conveyer against screw 7.

If the change bar 15 is now moved in the opposite direction, the conveyer head will engage one arm of the latch 21, lift the latch to clear the notch 17, whereupon the spring 19 will engage the conveyer head and force the latter through the notch to the opposite side of the change bar. The latch 21 will then drop to close the notch behind the change bar, and thereby lock the conveyer against screw 6.

In order to lock the conveyer in neutral position, so that it is not engaged with either screw 6 and 7, I have provided a lever 23. In Fig. 2, the lever is shown locking the conveyer in neutral position. Lever 23 is pivoted upon the frame by means of pin 24. The end of the lever is disposed in front of the notch 16 when the change bar is in its right hand position. It is evident that in this position the conveyer cannot pass through the notch in the change bar.

Suppose the conveyer is in the position shown in Fig. 8 and the lever 23 in the position shown in Fig. 2, as the change bar is moved to the right, latch 20 is lifted to clear the notch 16 for the head 14 of the conveyer, spring 18 would then move the conveyer head into the notch and against the end of lever 23. The conveyer would then be held in this intermediate position in the notch 16 between the end of lever 23 and the spring 18, in which position the conveyer would not be moved by the screw. Fig. 3 shows the conveyer bar in intermediate or neutral position. Swinging the lever 23 in the direction of the arrow will move the end of the lever from in front of the conveyer head, releasing it and permitting the spring finger 18 to force the conveyer head through the notch and against the screw 7.

Latch 20 then drops locking the conveyer against the screw.

The change bar 15 may be moved automatically by means of arms which stand in front of the ends of the change bar at the desired end of the carriage travel. Such arms are not shown in the drawing, as the change bar may be moved manually or by any other desired means.

Brackets 25 and 26 secured to the carriage frame 10, longitudinally secure the conveyer 9 to the carriage but permit transverse movement for transfer of the conveyer.

What I claim is:

1. A mechanical movement comprising the combination of a pair of screws spaced from each other, a conveyer therebetween having threads thereon and arranged to be moved into engagement with either of said screws, a change bar for maintaining said conveyer in engagement with either screw, means on said bar to transfer said conveyer from one screw to the other, and means operable at will to hold said conveyer in neutral position out of engagement with both screws.

2. A mechanical movement comprising the combination of a pair of screws spaced from each other, a conveyer having threads arranged to be swung into engagement with either screw, a change bar for said conveyer arranged to hold the latter in engagement with either screw, means on said bar to transfer said conveyer from one screw to the other, and means on said bar permitting the conveyer to transfer and automatically locking the conveyer against a screw after its transfer.

3. A mechanical movement comprising the combination of a pair of screws spaced from each other, a conveyer having threads arranged to be swung into engagement with either screw, a change bar for said conveyer arranged to hold the latter in engagement with either screw, means on said bar to transfer said conveyer from one screw to the other, means operable at will to hold said conveyer in neutral position out of engagement with both screws, and means on said bar to automatically lock the conveyer against a screw after its transfer.

4. A mechanical movement, comprising the combination of a pair of screws spaced from each other, a rod disposed below and between said screws, a conveyer pivotally and slidably mounted thereon, said conveyer having threads and arranged to be moved into engagement wih either of said screws, a change bar slidably mounted with respect to said conveyer and arranged to engage and hold said conveyer in engagement with either screw, said bar having a pair of openings through which said conveyer may pass from one side to the other, means adjacent to said openings and on said bar to transfer said conveyer from one side of said bar to the other, and latches normally closing said openings.

5. A mechanical movement, comprising the combination of a pair of screws spaced from each other, a shaft disposed below and between said screws, a conveyer pivotally and slidably mounted thereon, said conveyer having threads and arranged to be moved into engagement with either of said screws, a change bar slidably disposed with respect to said conveyer and arranged to engage and hold said conveyer in engagement with either screw, said bar having a pair of openings through which said conveyer may pass from one side to the other, means adjacent to said openings and on said bar to transfer said conveyer from one side of said bar to the other, latches normally closing said opening, and means operable at will to hold said conveyer in neutral position out of engagement with both screws.

In witness that I claim the foregoing I have hereunto subscribed my name this 1st day of September, 1917.

ORVILLE P. NORMAN.